Sept. 1, 1936.   M. H. MARTIN   2,052,639
CAR TRUCK
Filed Aug. 10, 1932
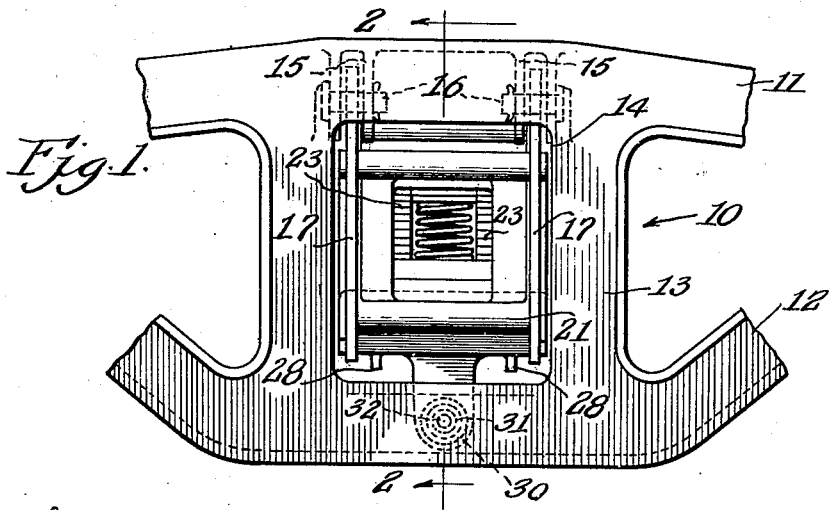
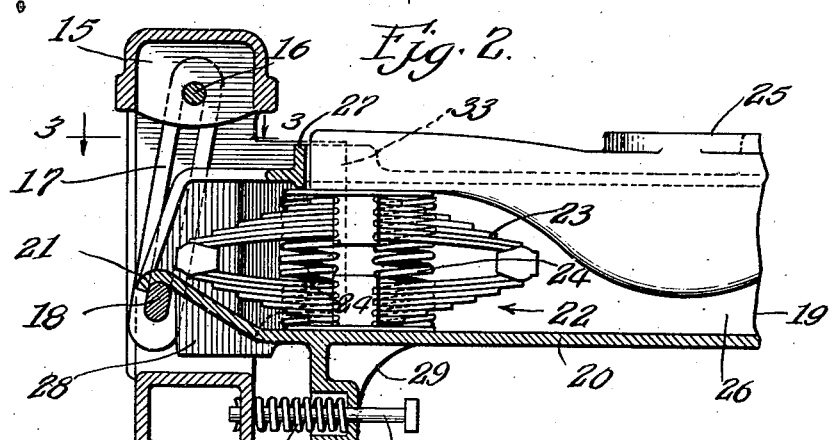
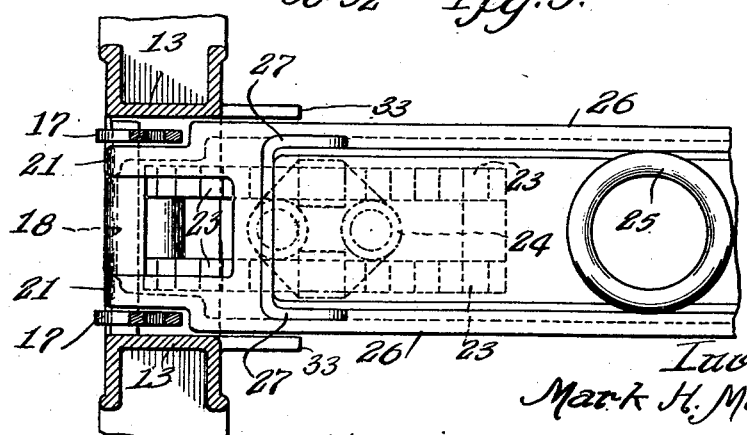
Inventor:
Mark H. Martin.
By Rector, Hibben, Davis & Macauley
Attys Patented Sept. 1, 1936

2,052,639

UNITED STATES PATENT OFFICE 2,052,639

CAR TRUCK

Mark H. Martin, Reading, Pa., assignor to Birdsboro Steel Foundry & Machine Company, Birdsboro, Pa., a corporation of Pennsylvania Application August 10, 1932, Serial No. 628,130

8 Claims. (Cl. 105—191)

My invention relates to car trucks, and more particularly to those of the swing motion type for use in passenger, caboose, freight or tender service.

One object of my invention is to devise a car truck having a truck bolster supported by a transom which is link supported from the compression members of the side frames and is therefore capacitated to accommodate lateral movements of the car body as the truck traverses a curve or passes over low spots in the track, the disposition of the links insuring a damping action on the swing of the transom and its return to a centralized position under the action of gravity.

A further object is to provide a truck of the character indicated in which the truck bolster is located and supported wholly between the side frames for the purpose of securing a distribution of the imposed load to all wheels of the truck, regardless of the condition of the tracks or the position of the car body.

A further object is to devise a car truck embodying a swinging transom which supports a truck bolster by means of non-harmonic spring groups composed of elliptic and coil springs in order to improve the riding qualities and increase the spring capacity of the truck, and prevent the vertical, "jiggle" characteristic of spring groups composed only of coil springs which frequently results in the latter being driven solid and the transmission of uncushioned shocks directly to the journals, wheels and rails.

A further object is to provide a truck of the type set forth above in which the truck bolster is guided in its vertical movements by suitable parts of the transom and in which the side frames are inwardly flanged on opposite sides of the window openings through which the ends of the transom extend in order to stop the longitudinal thrust of the transom occasioned by the application of the brakes.

A further object is the provision of a truck having a swinging transom whose ends extend through the window openings of the side frames, the transom having safety lugs on the ends thereof for service as supports on the side frames in the event of a failure of the transom swing links, and springs being provided between the side frames and transom to cushion transverse movements of the latter.

A further object is to devise a car truck of simplified construction in which the spring plank is entirely eliminated and in which removal of the side frames may be easily effected simply by jacking up the transom.

These and further objects of my invention will be set forth in the following specification, reference being had to the accompanying drawing, and the novel means by which said objects are effectuated will be definitely pointed out in the claims.

In the drawing:

Figure 1 is a partial elevation of one side of my improved truck, the wheels, journal boxes and allied parts being omitted.

Fig. 2 is a section along the line 2—2 in Fig. 1, looking in the direction of the arrows, and showing the manner of supporting the spring transom from the side frames and the spring suspension for the truck bolster.

Fig. 3 is a section along the line 3—3 in Fig. 2, looking in the direction of the arrows.

Referring to the drawing, the numeral 10 designates one of the side frames which may be of the customary integral box or pedestal type. Each frame comprises a compression member 11 and a tension member 12 which are spaced from each other by bolster guide columns 13 that define the usual window opening 14. The compression member 11 may have the inverted channel section, as illustrated in Fig. 2, while the tension member 12 may have the box section which is also shown in said figure, although these specific forms of sections are not important features of the invention.

Adjacent each guide column 13 is a pair of spaced webs 15 which extend between the sides of the compression member 11 and preferably also depend from the top thereof. Each pair of webs 15 supports a pin 16 that is substantially located in the vertical center plane of the side frame and pivotally mounted on each pin between each pair of webs 15 is the upper end of a swing link 17, the lower ends of said links extending downwardly within the window openings 14 and outwardly of the truck in accordance with standard practice. Loads imposed on said links are accordingly carried by the compression members of the side frames.

At their lower ends, a gib 18 is bridged between and carried by said links and the ends of a transom 19 extend within the window openings 14 for swinging support on said gibs. Specifically, the transom possesses a generally channel-shaped section in which the lower web 20 is directed upwardly and outwardly within the window openings of the side frames and is slightly hook-shaped, as at 21, in order to provide a non-shiftable connection with the gibs 18.

Except for the otherwise noted upward deflection of the web 20, the latter is generally horizontally disposed between the side frames and adjacent each frame supports a non-harmonic spring group 22 composed of elliptic and coil springs 23 and 24, respectively. Resting on the upper side of the spring group 22 are the ends of a truck bolster 25 which supports a car body (not shown) in the usual manner. The bolster 25 is located between the sides 26 of the transom 19 and the ends of the bolster are wholly disposed between the side frames 10 to thereby insure a distribution of the load created by the car body and its attendant lading upon all the wheels of the truck, regardless of the position of the car body or the unevenness of the track. The truck bolster is guided vertically, transversely and longitudinally of the truck by a pair of substantially U-shaped flanges 27 which embrace the ends of the bolster and are bridged between the sides 26 of the transom adjacent the upper edges of the transom sides.

As a safety feature and in order to provide an emergency support for the ends of the transom 19, if one of the swing links 17 should break, each end of the transom is provided with a pair of spaced lugs 28 which extend downwardly from the lower web 20 and are positioned to contact with the upper side of the tension member 12 between the guide columns 13. Also projecting downwardly from the lower web 20 and disposed between the side frames is a pair of extensions 29, each of which is provided with a pocket 30 that faces outwardly toward the inner side of the adjacent side frame. Located within the pocket 30 is one end of a coil spring 31, the opposite end of which abuts against the tension member side of the adjacent side frame, and said spring is maintained in position by means of a suitable pin 32 that extends through the adjacent side wall of the tension member and also through and beyond the extension 29. The purpose of the spring 31 is to cushion transverse movements of the transom 19 as it swings from side to side.

Flanges 33 project inwardly from the guide columns 13 of each side frame closely adjacent the side walls 26 of the transom 19. The purpose of these flanges is to provide rubbing or stop plates in order to take up the longitudinal thrust of the transom 19 occasioned by an application of the brakes of the truck and to maintain the side frames in relatively square position.

So far as the swing motion action of the transom is concerned, it is generally similar to that now obtaining in trucks of the generally well known swing motion type, that is, it accommodates lateral movement of the car body, reduces shock from side-lurching, decreases rail and flange wear, and reduces wear on the coupler knuckles and journal bearings. The disposition of the links 17 sets up a damping action against the swinging tendency of the transom 19 and positively insures a return of the transom 19 to its normal, centralized position under the action of gravity after the truck has left a curve, for example, and entered a straight portion of the track, or after the truck has passed over low spots in the track.

Two of the most important features of my improved truck reside in the disposition of the truck bolster wholly between the side frames which insures a distribution of the imposed load to all wheels of the truck and thereby obviates one hazard of railway operation, namely, the lightly loaded wheel. The other feature consists in the utilization of a non-harmonic spring group which comprises both elliptic and coil springs whose natural periods of vibration are so adjusted to each other as to positively exercise a damping action, one upon the other, so that any tendency of the spring group to set up violent oscillations, which now characterizes simple helical spring groups, is positively prevented. The truck, therefore, possesses easier riding qualities, than one which utilizes simple coil springs, and this factor serves to increase the longevity of the truck as well as of providing a truck that is particularly adapted for the carriage of perishable goods, such as in refrigerator car service.

I claim:

1. In a car truck, the combination of side frames having inwardly extending flanges and compression members, links swingably depending from the members, a transom carried by said links extending between said frames and guided by said flanges, and bolster springs supported by said transom.

2. In a car truck, the combination of side frames having inwardly extending flanges and compression members, links swingably depending in substantially the longitudinal center plane of the members, a transom carried by said links extending between said frames and guided by said flanges, and bolster springs supported by said transom.

3. In a car truck, the combination of side frames including window openings and having inwardly extending flanges on opposite sides of the openings, a swingable transom connecting said frame with its ends extending into said openings, the longitudinal thrust and endwise movements of said transom being stopped and guided by said flanges, respectively, springs carried by said transom, and a bolster mounted on said springs.

4. In a car truck, the combination of side frames having compression and tension members and window openings disposed between the members, swing links depending from the compression members, a transom carried on said links with the ends thereof projecting into said openings, and safety lugs provided on the underside of said transom to support the same on the tension members operative upon a failure of said links.

5. In a car truck, the combination of side frames having tension members, a swingable transom connecting said frames, lugs depending from the underside of said transom within said frames, and springs interposed between said lugs and the tension members to cushion swinging movements of said transom.

6. In a car truck, the combination of side frames having compression members, links swingably depending from the members, a transom resting on the links for swinging movement between the frames, a non-harmonic spring group located adjacent each end of said transom and resting thereon, and a bolster carried by said groups located wholly between said frames.

7. In a car truck, the combination of side frames having compression members, links swingably depending from the members, a hollow transom resting on the links for swinging movement between the frames, springs carried by the transom, a bolster mounted on the springs within the transom, and flanges on the transom for guiding the vertical movement of the bolster.

8. In a car truck, the combination of side frames having compression members, links swingably depending from the members, a transom resting on the links for swinging movement between and guided by the frames, and bolster springs supported by the transom.

MARK H. MARTIN.